United States Patent [19]
Michel et al.

[11] Patent Number: 5,416,633
[45] Date of Patent: May 16, 1995

[54] TWIN-IMAGE BINOCULARS

[75] Inventors: Claude Michel, Asnieres; Jean-Pierre Le Pesant, Gif sur Yvette, both of France

[73] Assignee: Thomson-CSF, Puteaux, France

[21] Appl. No.: 968,206

[22] Filed: Oct. 29, 1992

[30] Foreign Application Priority Data

Oct. 31, 1991 [FR] France ............... 91 13491

[51] Int. Cl.⁶ .................................................. G02B 23/10
[52] U.S. Cl. ............................. 359/410; 359/630; 359/638; 359/49; 359/87
[58] Field of Search .......... 359/409, 410, 630, 638, 359/48, 49, 50, 87, 600

[56] References Cited

U.S. PATENT DOCUMENTS

| | | | |
|---|---|---|---|
| 1,892,444 | 12/1932 | Bausch | 359/409 |
| 3,671,100 | 6/1972 | Bushman et al. | 359/630 |
| 3,851,304 | 11/1974 | Picardat | 359/630 |
| 3,936,148 | 2/1976 | Ellis | 359/630 |
| 4,012,123 | 3/1977 | Fuller | 359/630 |
| 4,193,666 | 3/1980 | Cojan | 359/630 |
| 5,050,962 | 9/1991 | Monnier et al. | 359/630 |
| 5,117,300 | 5/1992 | Wiemer | 359/87 |
| 5,170,153 | 12/1992 | Migozzi et al. | 359/630 |
| 5,214,522 | 5/1993 | Tagawa | 359/50 |

FOREIGN PATENT DOCUMENTS

| | | |
|---|---|---|
| 204471 | 12/1986 | European Pat. Off. . |
| 0286496 | 10/1988 | European Pat. Off. . |
| 0381449 | 8/1990 | European Pat. Off. . |
| 404177 | 10/1984 | Germany . |
| 59-087419 | 9/1984 | Japan . |
| 0003631 | 1/1989 | Japan ............... 359/48 |
| 406336 | 2/1934 | United Kingdom . |

*Primary Examiner*—Edward K. Look
*Assistant Examiner*—Christopher Verdier
*Attorney, Agent, or Firm*—Roland Plottel

[57] ABSTRACT

An optical device, similar to binoculars, which includes, between the objective lens and the eyepiece a miniature screen displaying an image controlled by a computer, and an optical reflex device capable of superimposing the screen image on the image seen through the objective lens. The device also includes, selectively or cumulatively, a variable light attenuator and a light amplifier for night vision. The device can be used, in conjunction with a computer, to add further information on geographic positions, friends, enemies, infrared images, etc. into the scene seen through the binoculars.

17 Claims, 5 Drawing Sheets

TWIN-IMAGE BINOCULARS

BACKGROUND OF THE INVENTION

The invention is a viewing device, particularly a viewing device which allows an image consisting, for example, of symbols such as geographic or any other symbols, to be superimposed on a first image of, for example, a natural scene.

The second image can be any image or an image of the scene observed, processed, for example, to produce an "infrared image" i.e. an image in which contrasts are determined by the temperature of the various elements in the scene.

In the prior art, scenes are observed through a telescope (the navy) or, more frequently, through binoculars, appreciated for the luminosity of the image produced.

SUMMARY OF THE INVENTION

According to this invention, there is provided, to the observer, a second image superimposed on the observed image. This second image can be a symbolic image extracted from a map of the scene observed and indicating, for example, bridges and other outstanding features in the scene. In addition to these geographical symbols, the invention also allows other symbols representing, for example, friendly or enemy positions to be indicated using symbols indicative of the type of position (tank, machine gun nest, etc.).

This second image can also be a synthetic image processed to be displayed in addition to what is observed. For example if the scene includes an archaeological site, it is possible to display a reconstitution of the site. Similarly, it is possible to superimpose an image of a finished building on the scene while the building is under construction.

Finally, this second image can be a processed version of the observed image.

The above application of the invented device is that employed when the invention is used as a viewing device called, by analogy with aeronautical applications, a "head-up display", i.e. a viewing device in which an image, intended to represent points, lines or surfaces, is superimposed on an image of the geographical zone.

The invented device can also be used as a head-down display. In this application, the outside scene is no longer required and the device is used solely to display an image generated, for example, by a computer and the associated memory. The image can be an image of the geographical area around the observer or nearby zones at various scales.

Finally, the invention satisfies all these applications in a light-weight, inexpensive form.

This invention is a viewing device with a casing which houses optical components, including an objective lens and an eyepiece, these components providing a view along an axis known as the "optical axis", components to adjust the focus, accessible from outside the casing, these optical components creating an image from a field of view which may include all or part of a zone defined by the optical axis and aperture angle of the optical components, the device also including:
  components to display a luminous image generated by controllable pixels,
  at least one optical reflex component to superimpose the image from the display components on the image of the field of view.

The invention is, therefore, a field glass, either a telescope or binoculars, comprising a casing which contains the objective lens and the eyepiece and, preferably between these two, a device to display an image generated, for example by a computer outside the device and a reflex device of the semi-transparent slide type which allows another image, that of a screen, to be superimposed on the image seen through the objective lens and at the same position. The screen image generated by the screen may itself be luminous, for example if the screen is a light-emitting screen formed from a light-emitting powder known to the prior art, this powder being placed between two glass slides which carry a network of electrodes. The arrangement of these electrodes defines the number of pixels in the image which can be formed. The luminous intensity of each pixel depends on the field created between the electrodes which control that pixel. Depending on the screen configuration, the image can be monochromatic or polychromatic.

The composition of such screens, and the means of controlling them, are known to the prior art and will not be described further.

The image generated by the screen need not necessarily be luminous in itself and, in this case, a lighting device must be added. This device can be of any type known to the prior art, particularly a light-emitting plate, a diode, a fluorescent tube, etc.

The reflex device projects the image from the screen into the optical path in the binoculars. In its simplest form, there is only one reflex device comprising a semi-transparent slide which, preferably, can be retracted by rotation to allow the user to select either the outside image alone or the image from the screen superimposed on the outside image.

In a more sophisticated form, the reflex system can also include, between the screen and the semi-transparent slide, other optical components such as lenses or mirrors to adjust the size of the screen image and the optical path this image follows. All these devices can also be replaced by a hologram acting as a mirror and a lens.

The invented device can include, in addition to the screen and the reflex system, additional components to act as an objective lens shutter.

The word "additional" is included because, in the prior art, telescopes generally include pivoting or sliding shutters to protect the objective lens but which can also be used as a shutter.

With a shutter, the invented device can be used as a head-down display to view the image of the screen only.

In this configuration, the optical device is similar to a magnifying glass that can be used to display the screen image at a reasonable scale. This type of shutter, which is convenient for head-down work, may be too crude for head-up use.

In this second mode, it may be required to display the outside image and the screen image alternately. In this case, the shutter can be a liquid crystal slide with two faces, each face carrying a transparent electrode. Depending on the voltage applied, the crystals absorb a varying amount of outside light. This type of shutter has a double advantage: firstly, it allows head-down work as described above and, secondly, it can be used to adjust the brightness of the outside image so that there is no excessive difference in brightness between the outside image and the screen image and the two images are clearly visible simultaneously.

It was said earlier that the binoculars complying with the invention included a screen producing pixels, the status of the various pixels depending on the voltage applied across the terminals of the electrodes which control each pixel.

Preferably, this electrode voltage is controlled by a computer. Methods of achieving such control, using sets of instructions, data stored in a memory and the means to read the data from data storage devices, such as magnetic devices or optical disks, are known to the prior art and will not be described further.

BRIEF DESCRIPTION OF THE DRAWINGS

A specific example of an embodiment and its variants will now be described, referring to the appended drawings in which.

DESCRIPTION OF THE PREFERRED EMBODIMENTS

The particular embodiment of the device which will be described here is a pair of binoculars with, conventionally, two telescopes, each containing an objective lens and an eyepiece. As far as the optical section is concerned, the following description applies to only one of the telescopes, i.e. that which contains the additional devices complying with the invention.

Figure 1:
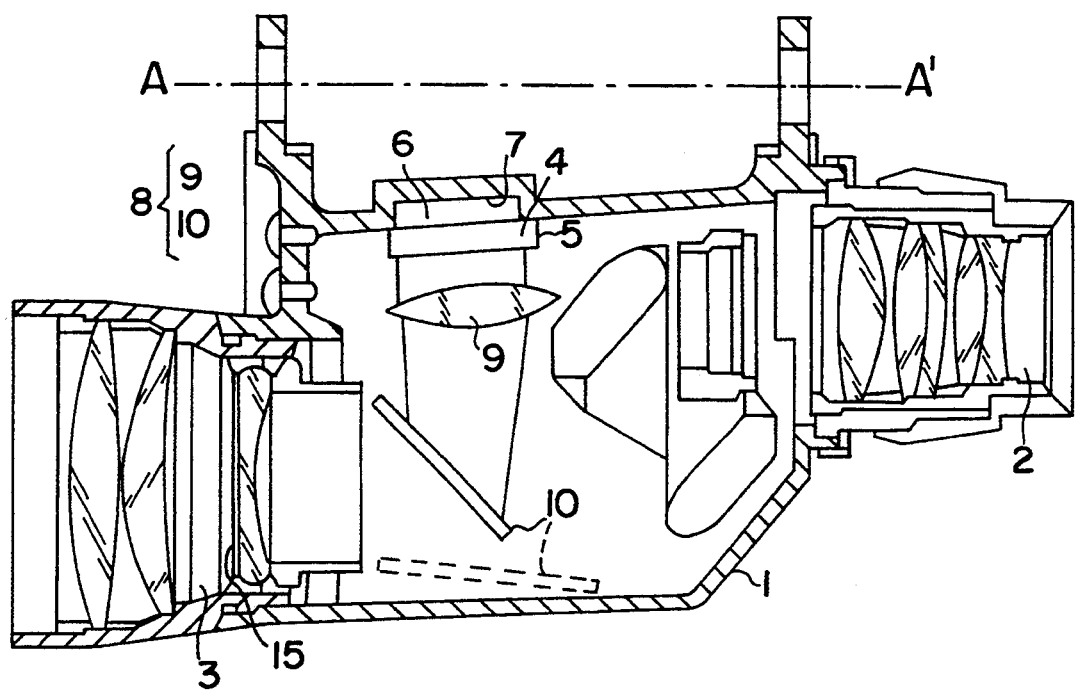
FIG. 1 is a transverse cross-section on the horizontal plane through the center of one telescope in a pair of binoculars complying with the invention.
Figure 1B:
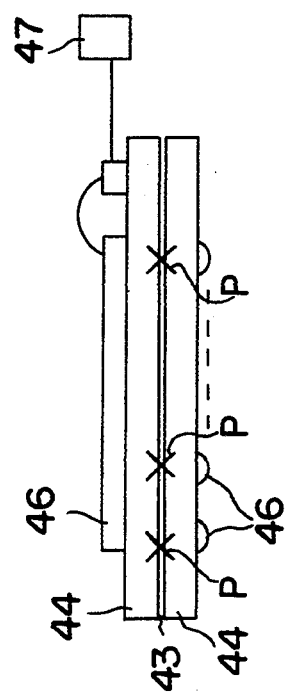
FIGS. 1a and 1b are respectively schematic plan and schematic cross-sectional views of a screen of FIG. 1.
Figure 1A:
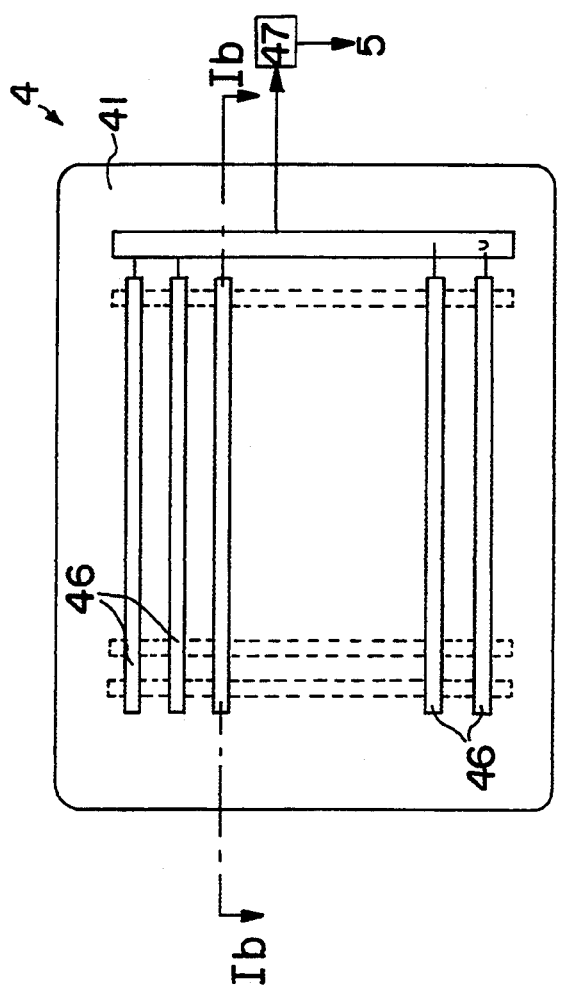

FIG. 1 is a transverse cross-section on a horizontal plane through the center of a binocular telescope complying with the invention and containing the devices to display the second image.

Conventionally, the telescope includes a casing 1, eyepiece 2 and objective lens 3. The binocular line of sight is represented by the line AA' which is the axis of symmetry of the two telescopes.

In the particular device shown, the telescope also includes, positioned laterally between the eyepiece and the objective lens, a device to display an electronic image, consisting of screen 4, made of small liquid crystals. The total area of the screen is 24×24 mm2. This area can contain 512×512 pixels, each measuring 30×30 g2. The screen borders 41 are 3 mm wide and are used for connection to an electrode network 46. The network and a lighting device are connected to a connector 5 for connection to an outside computer, possibly via an adaptor interface board. The electric power supply is 3 mA at 5 volts. The lighting device consists of a light-emitting plate 6, of the same dimensions as the screen, which offers the advantage of being very thin—approx 1 mm thick—and offering spectrum selectivity adaptable to the reflex dichroic mirror 7. The combined power consumption of the screen and its lighting system, under the conditions in which they are used in the invention and to provide the required contrast with the outside luminosity, is 0.01 to 2 watts.

The screen image generated by the screen 4 may itself be luminous, for example if the screen is a light-emitting screen formed from a light-emitting powder known to the prior art. This powder 43 being placed between two glass slides 44 which carry the network of electrodes 46. The arrangement of these electrodes defines the number of pixels p in the image which can be formed. The luminous intensity of each pixel depends on a field strength created between the electrodes 46 which control the pixel. Depending on the screen configuration the image can be monochromatic or polychromatic.

The composition of such screens, and the means of controlling them e.g. by a control 47, are known to the prior art and will not be described further.

The image generated by the screen 4 need not necessarily be luminous in itself and, in this case a lighting device must be added. This device can be of any type known to the prior art, particularly a light emitting plate 6, a diode, a fluorescent tube, etc.

An optical device 8, consisting in this case of a lens 9 and a slide 10 with parallel semi-transparent faces, positioned at 45° to the optical axis of the objective lens, allows the image from the screen to be superimposed on the image seen through the objective lens. The composition of the image reflex device and the screen arrangement can be different in other variants.

Figure 2A:
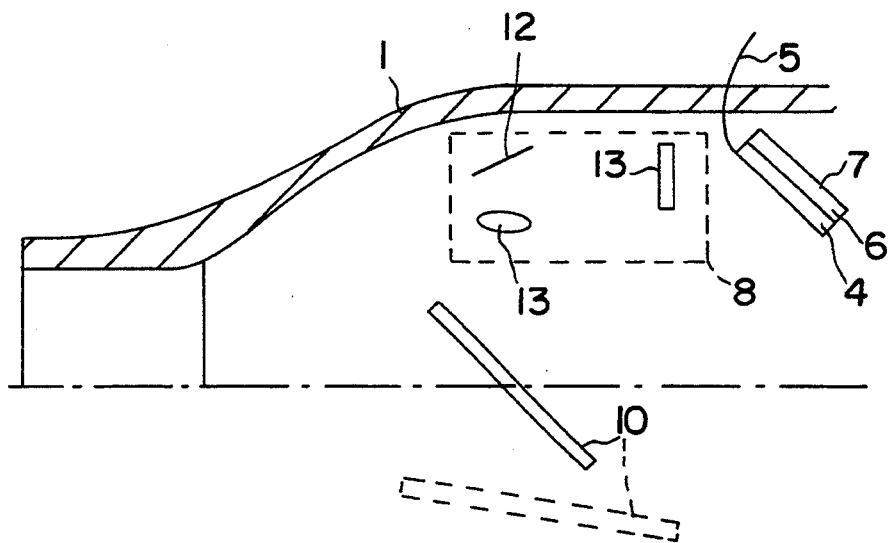
FIGS. 2a and 2b are schematic views of alternative embodiments of FIG. 1.
Figure 2B:
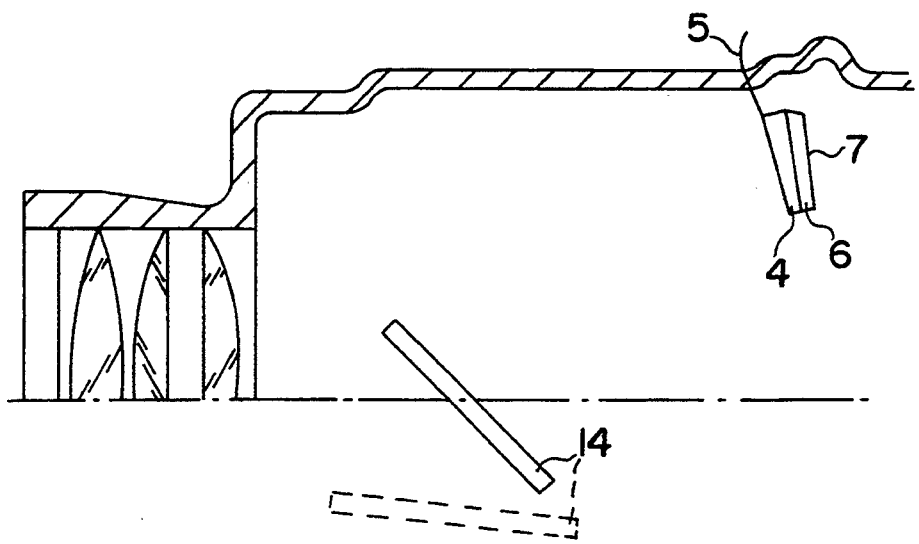

FIG. 2 is a schematic view of variants in one of which (FIG. 2a), to obtain a longer optical path between the screen 4 and the reflex slide 10, the screen 4 is positioned differently.

In this case, the optical reflex device 8 consists of a reflex mirror 12 and one or several lenses 13.

In the other variant (FIG. 2b), the reflex device 8 and the semi-transparent slide 10 are replaced by a hologram 14 which acts both as a lens and a mirror. The hologram 14 is in the position of the slide 10.

In all variants, the slide 10 or hologram 14 can be retracted, for example by rotation. The retracted position is shown by dotted lines.

Figure 3:
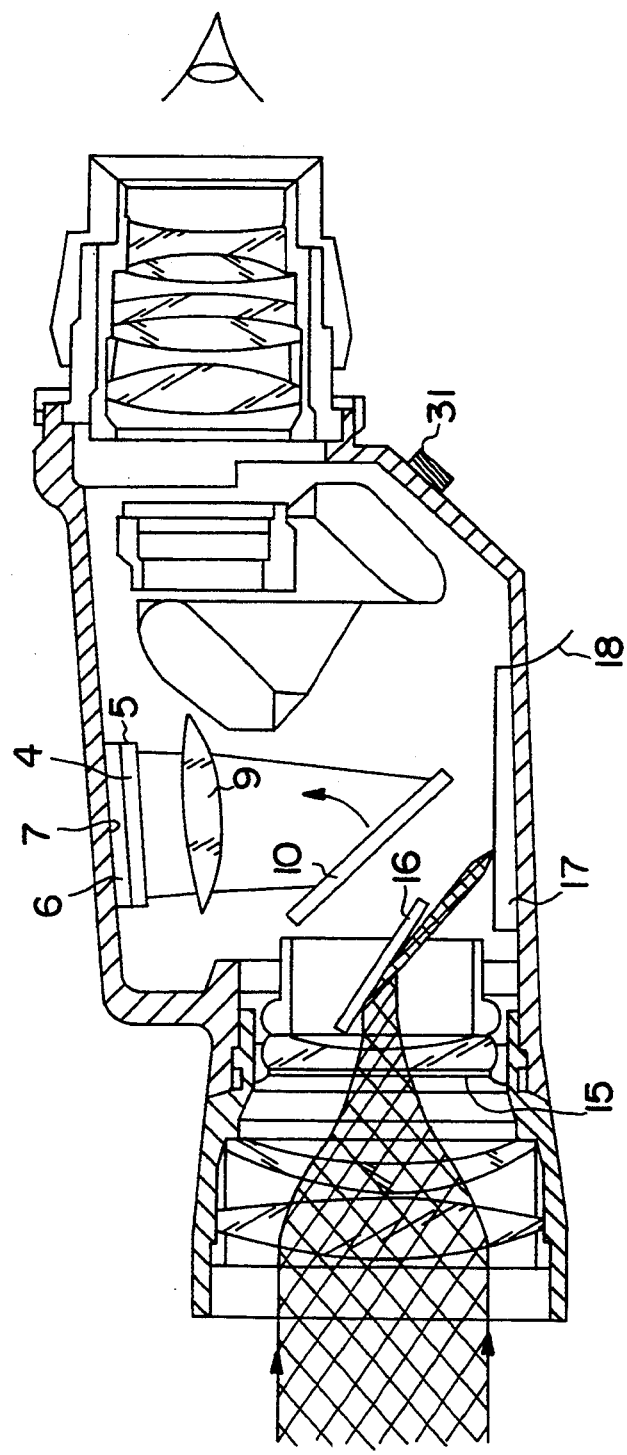
FIG. 3 represents the telescope shown in FIG. 1.
Figure 4:
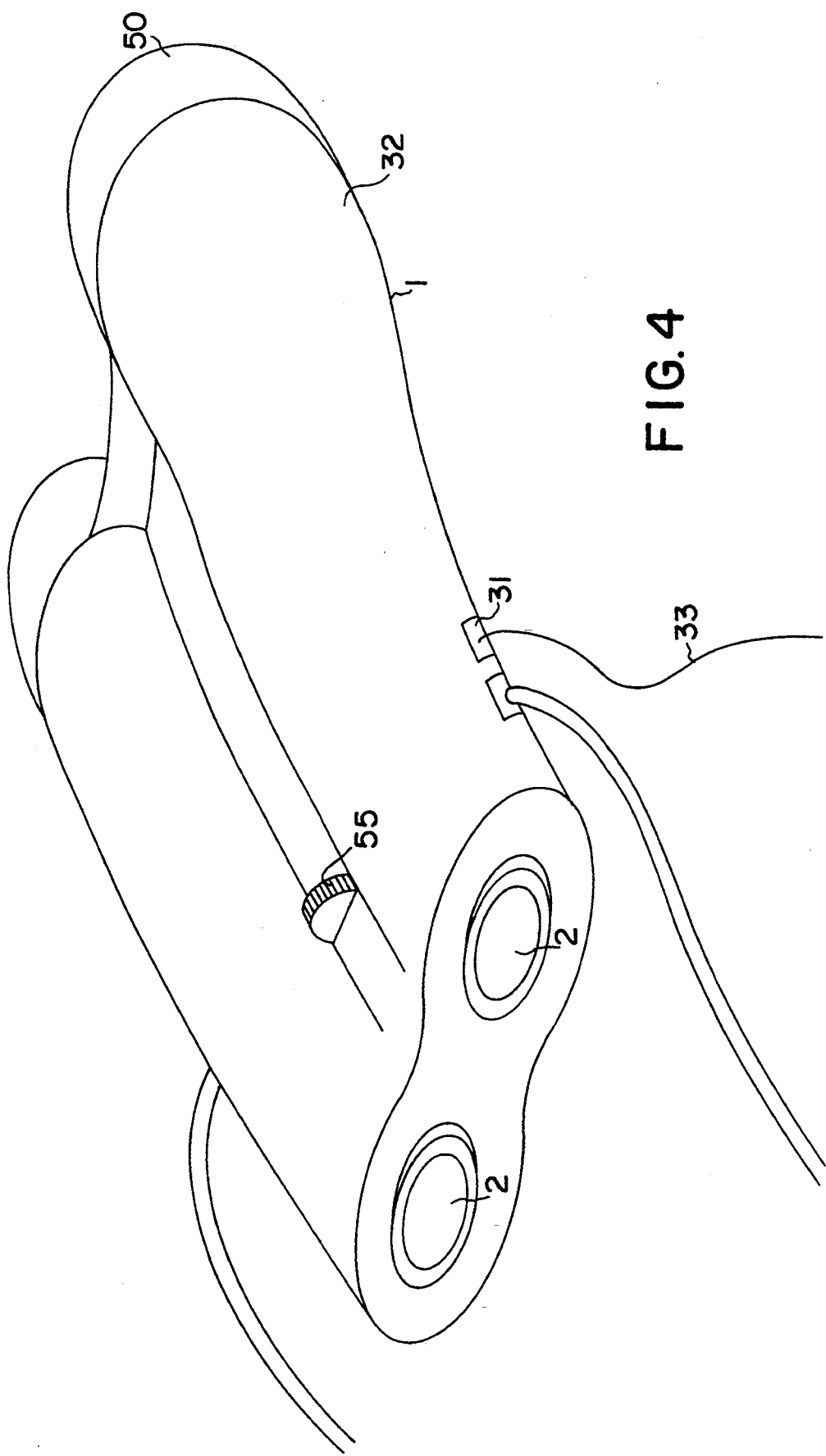
FIG. 4 is a perspective view of the binoculars fitted with a night-vision system.

FIG. 3 shows the same section on the same binocular telescope as FIG. 1 but includes additional components described below. The additional components include a variable optical transmission attenuator 15.

This attenuator 15, already known to the prior art, is a set of two transparent slides between which is inserted a liquid crystal with chiral dichroic molecules. Depending on the orientation of the molecules, controlled by the transparent electrodes on the slides, the slide allows more or less light to pass. The transmissivity can be varied from almost total to almost zero.

The binocular casing includes, immediately behind the objective lens, a retractable semi-transparent slide 16 which deflects the image towards a matrix of detectors 17.

In a particular embodiment, the function of this slide is fulfilled by slide 10 which, therefore, fulfils a double function.

The matrix can be sensitive to visible light or, preferably, to infrared radiation. The luminosity values detected by this matrix can be transmitted to a computer via link 18. After processing, the image output by sensor matrix 17 can be transmitted to screen 4 via the links which connect this screen to a computer.

All the links to the computer which, in this embodiment, is outside the binoculars are connected to the binoculars by the connector 31. This connector carries links 5 and 18.

The above description of the binocular telescope does not include all the additional or optional modules which can be included to extend the field of use. For example an optional light-amplifier module 50, represented in FIG. 5, can be added. This figure is a perspective view of a viewing device 32 complying with the invention. It also shows a control 55 to adjust the sharpness of the image, the connector 31 and a link 33 to a computer.

What is claimed is:

1. A viewing device (32) comprising a casing (1) housing optical components including an objective lens (3) and an eyepiece (2), these components providing a view along an axis (AA'), a focus adjustment (55) accessible from outside the casing (1), said optical components form an image from a field of view which may include all or part of an area determined by an optical axis and an angle Known as the aperture of the optical components, said viewing device also including, inside the casing (1):
    a component (4, 5, 6, 7) to display a luminous image formed of pixels controlled by a computer, and
    at least one reflex optical component (9, 10) to superimpose the image from the display component (4, 5, 6, 7) on the image of the field of view and mounted inside the casing, and at least one link to connect the display component (4, 5, 6, 7) to said computer.

2. The device of claim 1 in which the component to display a luminous image comprises a light-emitting screen.

3. The device of claim 1, in which the components which generates a luminous image consists of a liquid crystal screen illuminated by lighting components.

4. The device of claim 3, in which the lighting components consist of a light-emitting plate and a reflex mirror.

5. The device of claim 1, in which the image reflex component comprises at least one lens and a semi-transparent mirror.

6. The device of claim 1, in which the reflex component comprises at least one lens, a mirror and a semi-transparent slide.

7. The device of claim 1, in which the reflex component is a hologram which acts as a mirror and fulfils a focussing function.

8. The device of claim 1, including an electrically-controlled attenuator.

9. The device of claim 8, in which the attenuator consists of a liquid crystal held between two thin transparent slides to which electrodes are fixed.

10. The device of claim 1 which also includes, placed behind the objective lens, a semi-transparent slide (16) which reflects the image seen through the objective lens towards a sensor matrix.

11. The device of claim 10 in which the sensors are infrared sensors.

12. The device of claim 1, wherein said pixels of said component to display a luminous image comprise a network of electrodes.

13. The device of claim 12, wherein said component with said pixels comprises a light emitting screen (4) located between two glass slides which carry said network of electrodes, wherein the arrangement of said electrodes define the number of said pixels in the image.

14. The device of claim 13, wherein means are provided for controlling a field between the electrodes and wherein the intensity of each pixel depends on said field.

15. The device of claim 1, wherein the component to display a luminous image comprises a screen approximately $24 \times 24$ mm$^2$ and comprises approximately $512 \times 512$ pixels, each measuring approximately $30 \times 30 \mu^2$.

16. The device of claim 15, wherein said screen has a border approximately 3 mm wide, and said screen has an electrode network, which electrode network has connections on said screen border.

17. The device of claim 16, wherein said component to display a luminous image further comprises a lighting device (6), adjacent to and of the same dimensions as the screen, and said network and said lighting device are connected to a connector (5) for connection to outside the viewing device (32).

* * * * *